US006264786B1

(12) United States Patent
Cromett

(10) Patent No.: US 6,264,786 B1
(45) Date of Patent: Jul. 24, 2001

(54) USER-CREATED TEMPORARY TATTOOS

(75) Inventor: John Cromett, Portland, OR (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/085,947

(22) Filed: May 28, 1998

(51) Int. Cl.[7] ...................................................... B32B 31/00

(52) U.S. Cl. .......................... 156/289; 156/230; 156/285; 156/247; 156/267; 156/278; 156/288

(58) Field of Search .................................... 427/147, 149, 427/152; 156/230, 247, 267, 278, 285, 288, 289, 306.3

(56) References Cited

U.S. PATENT DOCUMENTS

| | | | |
|---|---|---|---|
| D. 360,472 | | 7/1995 | Cooper . |
| 683,765 | | 10/1901 | Howard . |
| 1,811,804 | | 6/1931 | Poschel . |
| 2,425,653 | | 8/1947 | Stewart . |
| 2,578,150 | | 12/1951 | Rathke . |
| 2,700,619 | * | 1/1955 | Sullivan et al. . |
| 3,898,357 | | 8/1975 | Miller et al. . |
| 4,169,169 | | 9/1979 | Kitabatake . |
| 4,260,646 | | 4/1981 | Farrell et al. . |
| 4,285,978 | | 8/1981 | Quinlivan . |
| 4,337,289 | | 6/1982 | Reed et al. . |
| 4,414,546 | | 11/1983 | Taylor et al. . |
| 4,440,078 | | 4/1984 | McCrery et al. . |
| 4,522,864 | | 6/1985 | Humason et al. . |
| 4,529,654 | | 7/1985 | Drum . |
| 4,594,276 | | 6/1986 | Relyea . |
| 4,597,495 | | 7/1986 | Knosby . |
| 4,608,295 | | 8/1986 | Drum . |
| 4,713,273 | | 12/1987 | Freedman . |
| 4,785,563 | | 11/1988 | Friedman . |
| 4,883,556 | | 11/1989 | Leavitt et al. . |
| 4,888,075 | | 12/1989 | Freedman . |
| 4,940,622 | | 7/1990 | Leavitt et al. . |
| 4,946,532 | | 8/1990 | Freeman . |
| 5,032,449 | * | 7/1991 | af Strom . |
| 5,084,095 | | 1/1992 | Fritz . |
| 5,098,772 | | 3/1992 | af Strom . |
| 5,143,570 | | 9/1992 | Freedman . |
| 5,148,196 | | 9/1992 | Spector . |
| 5,186,782 | | 2/1993 | Freedman . |
| 5,213,873 | | 5/1993 | Yasuda et al. . |
| 5,343,386 | * | 8/1994 | Barber . |
| 5,372,669 | | 12/1994 | Freedman . |
| 5,421,765 | * | 6/1995 | Lehmann et al. . |
| 5,470,351 | | 11/1995 | Ross et al. . |
| 5,494,745 | | 2/1996 | Vander Velden et al. . |
| 5,516,393 | | 5/1996 | Freedman . |
| 5,578,353 | * | 11/1996 | Drew, III . |
| 5,601,859 | * | 2/1997 | Penaluna . |
| 5,623,581 | * | 4/1997 | Attenberg . |
| 5,658,971 | | 8/1997 | Allin et al. . |
| 5,676,401 | * | 10/1997 | Witkowski et al. . |
| 5,700,564 | | 12/1997 | Freedman . |
| 5,816,269 | | 10/1998 | Mohammed . |
| 5,817,385 | | 10/1998 | Stanislav . |

* cited by examiner

*Primary Examiner*—Merrick Dixon
(74) *Attorney, Agent, or Firm*—Kolisch Hartwell Dickinson McCormack & Heuser

(57) ABSTRACT

A temporary tattoo formed from an image-bearing laminate for attachment to human skin. The laminate includes a printable release coating on a backing sheet and an image printed with ink on the printable release coating. A film that is impenetrable to the ink is attached to the image, and includes adhesive on an exposed face of the film. The coating, image and film may be attached to human skin by pressing the combination of the coating, image, film and adhesive on skin. A method of creating the temporary tattoo includes the steps of providing a coated release sheet, printing an image on the coated release sheet, providing a film, covering the image with the film so that the image is located between the film and the coating of the release sheet to create a film/image/coating laminate, attaching the film/image/coating laminate to skin, and removing a backing sheet of the release sheet from the film/image/coating laminate.

16 Claims, 2 Drawing Sheets

USER-CREATED TEMPORARY TATTOOS

BACKGROUND AND SUMMARY OF THE INVENTION

The present invention relates generally to the decoration of human skin, and specifically to user-created temporary tattoos for attachment to human skin. Through use of the devices and methods of the present invention, a printed image may be attached to human skin as decoration, formed as part of a layered appliqué. Preferably, the image is created on a computer by the end user of the decoration, printed with a printer attached to the computer, incorporated in an image-bearing laminate, and then applied to the skin.

Traditional tattoos are images made by applying permanent pigments under the skin, or by raising scars on the skin. Thus, traditional tattoos are essentially permanent, removable, if at all, only through complicated medical procedures. In view of this technical definition of the word "tattoo," the use of the word to describe the present invention is somewhat of a misnomer. It is believed, however, that it has become accepted in the trade to refer to various skin decorations as tattoos, even if they are not permanent.

Tattoos and other skin decorations long have fascinated both children and adults, but often are avoided because of the permanence of the resulting image. Accordingly, temporary tattoos have been developed, including those applied as an ink transfer, a stamp, and a decal. Examples of such temporally tattoos are found in U.S. Pat. Nos. 3,898,357, 4,522,864, 5,421,765, 5,578,353, and 5,601,859, the disclosures of which are incorporated herein by reference.

Temporary tattoos may be allowed to remain on the skin for various lengths of time, ranging from just a few minutes to several days, depending on the whims of the wearer of the tattoo, the amount of washing and rubbing to which the tattoo is exposed, and the durability of the tattoo. Because of the potentially extended time of contact between the tattoo and a wearer of the tattoo, there is a realistic concern that the inks used could be absorbed through the skin, resulting in possible injury to the wearer of the tattoo, even though the quantity of ink required to produce a tattoo may be quite small. Accordingly, the construction of temporary tattoos according to the prior techniques has been limited to the use of carefully selected, non-toxic inks. There is a need for temporary tattoos that may be made safely with a variety of inks, including those inks that may not be completely non-toxic, as may be found in some computer printers.

The prior temporary tattoos also are limited in that they generally lack any user creation of the tattoo. Rather, a predefined image is applied by the user. At best, the user exercises creativity only in the selection of the design and placement of the design on the body. There is a need, therefore, for user-created temporary tattoos that allow for increased user creativity.

One simple solution is to draw directly on ones skin with non-toxic temporary or permanent ink. However, this is very difficult for most people to do with any accuracy, and the location of the tattoo is very limited by ones ability to reach the part of the body on which the image is being applied. The present invention offers a better solution because it allows the creation of an image on a separate sheet of material, prior to applying the image to the body.

The present invention offers an even better solution by allowing a user to create an image on a computer, print the image using a computer printer, and then safely apply the image to human skin. This combines the user-creativity of computer-printed images with peace of mind for the user or parent of the user of the tattoo. The tattoo is simple to create, and the method may be used by young and old, with minimal instruction and supervision.

With the advent of computer sketch pads, digitizers, scanners and digital video and still cameras, computer images now combine many of the traits of drawings, paintings, photographs and photocopies, yet are easy for most people to create. Examples of computer-creation of images are disclosed in U.S. Pat. Nos. 4,635,132, 4,687,526, 4,923,848, 5,009,626, 5,109,281, 5,148,196, 5,343,386, and 5,623,581, the disclosures of which are incorporated herein by reference. The present invention allows these exciting and popular methods of image creation to be incorporated in the creation of a temporary tattoo, with very pleasing results.

The printable material on which the image of the present invention is printed is a coated release sheet, having a backing sheet and a printable releasable coating. When the backing sheet is wetted, the coating will separate from the backing sheet. The image is printed on the coating, so that the image is separable from the backing sheet. The coating is waterproof so that it protects the image from possible damage when the backing sheet is wetted. The release coating also winds up being the outer layer of the image-bearing laminate that forms the temporary tattoo of the present invention, protecting the image from damage by washing, rubbing and chaffing of the tattoo.

The image and coating are not applied directly to human skin. Rather, they are applied with a double-sided medical film, so that the film is between a wearer's skin and the image, and attached to both with adhesive. The image is layered between the film and the coating of the release sheet. The film both protects a wearer from any harmful inks that may have been used in printing the image, and makes the image last longer once applied by reinforcing the image and coating. It has the added advantage of being releasable from the skin when peeled back, so that the image may be removed from the skin at any time.

Other features and advantages of the present invention will be understood more readily after a consideration of the drawings and the Detailed Description of the Preferred Embodiment.

DETAILED DESCRIPTION OF THE PREFERRED EMBODIMENT

Figure 1:
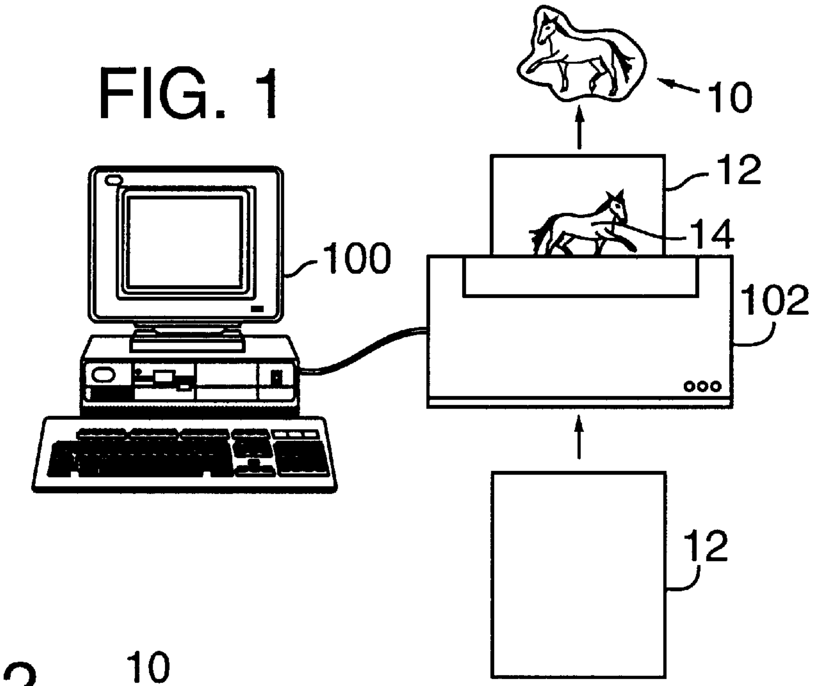
FIG. 1 is a view of a computer system being used to print an image on a coated release sheet.

Referring to FIG. 1, a computer-printed temporary tattoo according to the present invention is shown at 10. A computer and attached printer are shown at 100 and 102, respectively, and a coated release sheet is shown at 12. Coated release sheet 12 is printed with ink to form an image 14. It is image 14 that is applied to skin to form the skin decoration of the present invention.

Printer 102 preferably is an inkjet printer, capable of printing color and black and white images. However, many other computer printers may be used. Furthermore, various other techniques of printing an image on coated release sheet 12 may be used, including photocopiers, commercial printers, heat transfers, and even hand drawing.

Figure 2:
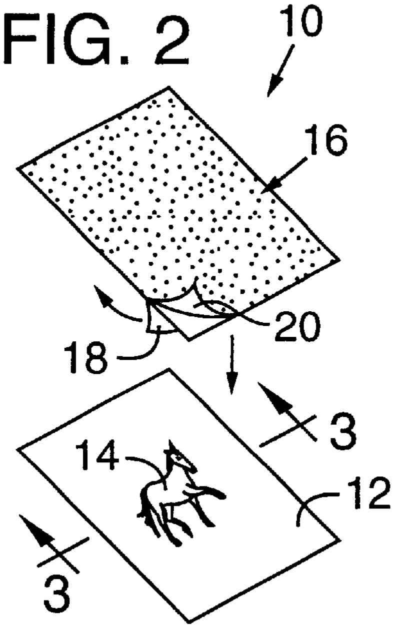
FIG. 2 is an isometric view of the coated release sheet of FIG. 1, after the image has been printed, with a film shown above the printed image.

Referring now to FIG. 2, printed image 14 and coated release sheet 12 are shown in proximity to a film 16. Film 16 is a double-sided adhesive tape, typically with a protective backing 18 on one side and a protective backing 20 on the other side. One of protective backings 18 and 20 is removed, and film 16 is attached to image 14 and release sheet 12.

Figure 3:
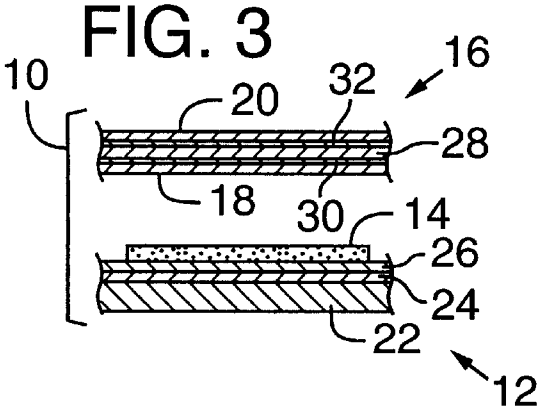
FIG. 3 is a greatly enlarged, somewhat exaggerated cross-sectional view of the sheet and film shown in FIG. 2, taken generally along line 3—3 in FIG. 2.

Referring now to FIG. 3, the specific components of coated release sheet 12 and film 16 are shown. Coated release sheet 12 includes a backing sheet 22 and a releasable, printable coating, preferably including a waterproof release layer 24, and a printable layer 26. The particular choice of waterproof release layer 24 and printable layer 26 will depend on the type of release mechanism used, and the types of inks used. Furthermore, a single-layer coating may be used.

Preferably, release layer 24 is waterproof, so that the releasable coating 24 protects image 14 from damage when backing sheet 22 is released. A waterproof coating also protects image 14 from other damage, as may occur when skin 200 is subjected to mild washing. A suitable coated release sheet is available from Arkwright, of Rhode Island, under their product designation L291-20A.

Film 16 also is shown in FIG. 3. It is believed that most satisfactory results in a finished tattoo 10 are obtained when film 16 is relatively thin, flexible, and clear. For example, a double-coated medical film available from 3M Medical Specialties, 3M Health Care Product No. 1512 has been found to work well. This medical film includes a transparent polyethylene layer 28, having a thickness of 1.5-mils. Polyethylene is believed to be sufficiently impenetrable to the ink used to create image 14 to protect a wearer of tattoo 10 from most potentially harmful components of the ink.

An adhesive 30 is on a first face or side of film 28, and a similar adhesive 32 is on a second side or face of film 28, opposite the first face. Preferably, adhesives 30 and 32 are hypoallergenic, pressure-sensitive acrylate. Protective backings 18 and 20 preferably are bleached Kraft-glassine paper, silicone coated on both sides so that each releases easily from adhesives 30 and 32. The resulting thickness of film 16, excluding protective backings 18 and 20, is approximately 3.4-mils.

Figure 4:
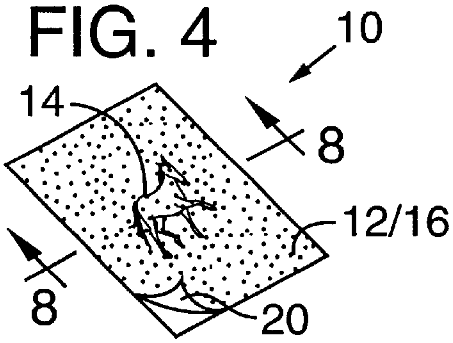
FIG. 4 is an isometric view of the sheet and film of FIG. 2, with the film adhered to the image and sheet, to create a sheet/image/film laminate.
Figure 5:
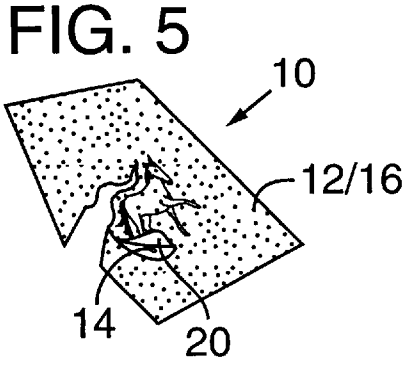
FIG. 5 is an isometric view of the sheet/image/film laminate of FIG. 4, with a portion of the laminate cut along an outline of the image.

In FIG. 2, protective backing 18 is shown being removed and, in FIG. 4, first face of film 16 is shown attached to image 14 and release sheet 12, resulting in a sheet/image/film laminate 12/16. The sheet/image/film laminate of FIG. 4 preferably is cut along the outline of image 14, typically with scissors. Such a cut is shown in FIG. 5, extending partially around image 14.

Preferably, film 16 and its protective backing 20 and adhesives 30 and 32 are transparent, or at least translucent, so that image 14 is visible through film 16, allowing a user to cut out image 14 without actually cutting into image 14. Since film 16 also is very thin, the cutting of the laminate does not need to follow the outline of image 14 exactly. A realistic and pleasing tattoo is obtained even if a substantial border of undecorated laminate 12/16 remains around image 14.

Figure 6:
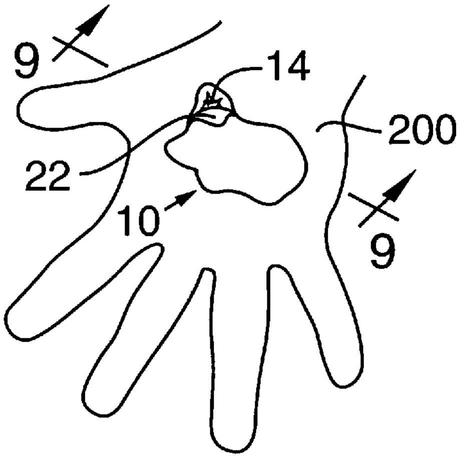
FIG. 6 is an isometric view of the sheet/image/film laminate of FIG. 5, cut along the outline of the image, applied to a human hand, with a portion of the backing sheet being peeled back to expose the resultant tattoo.

After laminate 12/16 is cut along the outline of image 14, protective backing 20 may be removed from film 16, and exposed adhesive 32 of film 16 may be pressed into contact and adhered to human skin 200, as shown in FIG. 6. Backing sheet 22 then may be removed from laminate 12/16. For most release sheets, this may be accomplished by wetting backing sheet 22. The resulting tattoo 10 is shown in FIG. 7, on hand 200.

Figure 7:
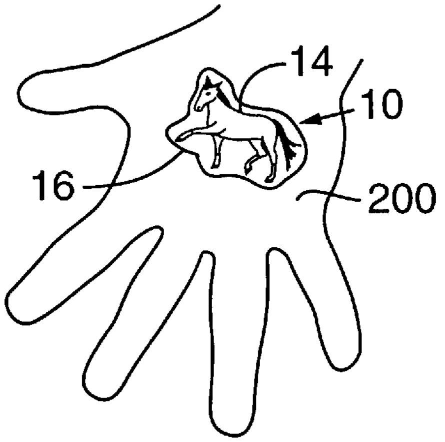
FIG. 7 is an isometric view of the tattoo shown in FIG. 6, with the backing sheet removed.

It will be noted from FIG. 7 that image 14 is reversed when applied to skin 200, when compared to image 14 shown in FIG. 1. Preferably, this reversing is actually done twice—once when the image is printed, and then again when it is applied to skin 200. The first reversing of image 14 is accomplished by the software of computer 100, so that a user creates the image in its correct orientation, and the software then mirrors the image prior to sending it to printer 102. The mirroring of images is a well known feature of many computer graphics programs.

Figure 8:
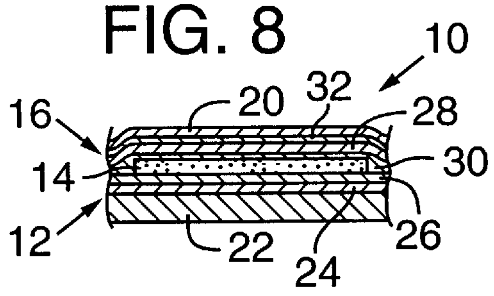
FIG. 8 is a greatly enlarged, somewhat exaggerated cross-sectional view of the sheet/image/film laminate of FIG. 4, taken generally along line 8—8 in FIG. 4.
Figure 9:
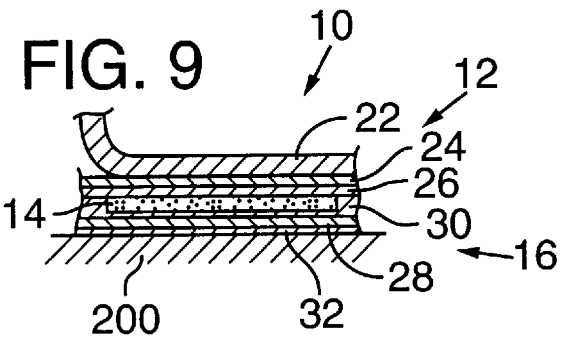
FIG. 9 is a greatly enlarged, somewhat exaggerated cross-sectional view of the sheet/image/film laminate of FIG. 6, applied to a human hand, taken generally along line 9—9 in FIG. 6.

Referring now to FIG. 8, the sheet/image/film laminate of FIG. 4 is shown in cross-section. By removing protective backing 20 from this laminate, an adhesive decal is obtained that may be applied to skin 200 as shown in FIGS. 6, 7 and 9. Backing sheet 22 then is released from the laminate, and image 14 remains on skin 200, encased between film 16 and the releasable coating of sheet 12, as shown in FIG. 9.

From the above identification of the elements of the temporary tattoo of the present invention, a method of creating a temporary tattoo may be described. The method includes the step of providing a coated release sheet 12 having a backing sheet 22 and a releasable printable coating on backing sheet 22, and providing film 16. In the preferred embodiment, the coating includes printable layer 26 and release layer 24.

The next step preferably includes printing image 14 on the printable coating of release sheet 12, followed by the step of covering image 14 with film 16 so that image 14 is located between film 16 and the coating of release sheet 12 to create a film/image/coating laminate 12/16. Preferably, film 16 is a film with adhesive 28, 30 on both sides of the film, and the step of covering image 14 with film 16 is accomplished by pressing adhesive 28 against image 14. Further refinements of the method include providing computer 100 and printer 102 attached to computer 100; and operating computer 100 and printer 102 to print image 14 on the printable coating of release sheet 12.

The additional steps of attaching film/image/coating laminate 12/16 to skin 200, and removing backing sheet 22 from film/image/coating laminate 12/16 result in a workable temporary tattoo. An even better tattoo is obtained if the method further includes the step of cutting film/image/coating laminate 12/16 approximately along an outline of image 14, as shown in FIG. 5. Furthermore, the step of removing the backing sheet from film/image/coating laminate 12/16 may include the step of wetting backing sheet 22 so that backing sheet 22 releases from the printable coating of sheet 12.

While the invention has been disclosed in its preferred form, it is to be understood that the specific embodiment thereof as disclosed and illustrated herein is not to be considered in a limiting sense. Numerous variations are possible and that no single feature, function, or property of the preferred embodiment is essential. The invention is to be defined only by the scope of the issued claims.

I claim:

1. A method of attaching a printed image to human skin, comprising the steps of:

providing a coated release sheet having a backing sheet and a releasable printable coating formed on the backing sheet;

printing an image on the printable coating of the release sheet;

providing a film having opposing sides and an adhesive disposed on one side;

covering the image with the film so that the image is located between the film and the coating of the release sheet to create a film/image/coating laminate;

attaching the film/image/coating laminate to skin with the adhesive; and removing the backing sheet from the film/image/coating laminate.

2. The method of claim 1, wherein the film is a film with adhesive on both sides of the film, and the step of covering the image with the film is accomplished by pressing the adhesive against the image.

3. The method of claim 1, wherein the step of printing the image includes the steps of:

providing a computer and a printer attached to the computer; and operating the computer and the printer to print the image on the printable coating of the release sheet.

4. The method of claim 3, wherein the printer is an inkjet printer.

5. The method of claim 1, further comprising the step of cutting the film/image/coating laminate approximately along an outline of the image.

6. The method of claim 1, wherein the releasable printable coating is waterproof.

7. The method of claim 1, wherein the step of removing the backing sheet from the film/image/coating laminate includes the step of wetting the backing sheet so that the backing sheet releases from the printable coating.

8. A method of attaching a printed image to human skin, comprising the steps of:

providing an image-bearing laminate for attachment to human skin, comprising:

a printable release coating on a backing sheet;

an image printed with ink on the printable release coating;

a film that is impenetrable to the ink, and that has a first face attached to the image and a second face opposite the first face; and adhesive on the second face of the film, wherein the coating, image and film may be attached to human skin by pressing the combination of the coating, image, film and adhesive on skin; and attaching the printed image to human skin by pressing the adhesive on the second face of the film against human skin.

9. The method of claim 8, wherein the laminate further comprises adhesive on the first face of the film, attaching the film to the image.

10. The method of claim 8, wherein the release coating is waterproof.

11. A method of attaching an image to human skin, comprising the steps of:

providing a layered applique comprising:

an outer printable release coating;

an image printed with ink on the outer release coating;

a film attached to the image with adhesive, so that the image is layered between the coating and the film; and adhesive on the film opposite the image; and attaching the image to human skin by pressing the adhesive against human skin.

12. The method of claim 11, wherein the outer release coating is waterproof.

13. A method of attaching an image to human skin, comprising the steps of:

providing an image-bearing laminate for attachment to human skin, comprising:

a coated, printable release sheet;

an image printed with ink on the coated sheet; and a double-sided, adhesive-coated film attached to the image; and attaching the image to human skin by pressing the adhesive-coated film against human skin.

14. The method of claim 13, wherein the release sheet includes a printable layer and a backing sheet.

15. The method of claim 14, wherein the printable layer is waterproof.

16. A method of attaching an image to human skin, comprising the steps of:

providing a skin decoration comprising:

a printable release means for receiving an image; and a film means for attaching the image to human skin and for protecting human skin from direct contact with the image;

printing an image on the release means; and attaching the release means and film means to human skin.

* * * * *